United States Patent
Jouper et al.

(10) Patent No.: US 10,326,299 B2
(45) Date of Patent: Jun. 18, 2019

(54) MOVEABLE SURFACE POWER DELIVERY SYSTEM

(71) Applicant: Astronics Advanced Electronic Systems Corp., Kirkland, WA (US)

(72) Inventors: Jeffrey A. Jouper, Newcastle, WA (US); John S. Lamb, Bothell, WA (US); Dennis P. Markert, Federal Way, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 306 days.

(21) Appl. No.: 15/249,575

(22) Filed: Aug. 29, 2016

(65) Prior Publication Data

US 2017/0077739 A1 Mar. 16, 2017

Related U.S. Application Data

(60) Provisional application No. 62/217,261, filed on Sep. 11, 2015.

(51) Int. Cl.
| | |
|---|---|
| *H02J 7/00* | (2006.01) |
| *H02J 7/02* | (2016.01) |
| *H04B 5/00* | (2006.01) |
| *B64D 11/06* | (2006.01) |
| *H02J 50/10* | (2016.01) |
| *B64D 11/00* | (2006.01) |

(52) U.S. Cl.
CPC ........ *H02J 7/025* (2013.01); *B64D 11/00152* (2014.12); *B64D 11/0624* (2014.12); *B64D 11/0638* (2014.12); *H02J 50/10* (2016.02); *H04B 5/0037* (2013.01); *H02J 7/0042* (2013.01)

(58) Field of Classification Search
USPC ........................................................ 320/108
See application file for complete search history.

(56) References Cited

U.S. PATENT DOCUMENTS

| | | | |
|---|---|---|---|
| 6,489,745 B1 | 12/2002 | Koreis | |
| 7,500,716 B2 | 3/2009 | Guerin et al. | |
| 7,971,929 B2 | 7/2011 | Kennard et al. | |
| 8,826,830 B2 * | 9/2014 | Pajic ....................... | A47C 7/70 108/44 |
| 8,878,393 B2 | 11/2014 | Kirby et al. | |

(Continued)

OTHER PUBLICATIONS

EP 16187365.8, Extended European Search Report, Issued by the European Patent Office, dated Feb. 17, 2017.

(Continued)

*Primary Examiner* — Robert Grant
(74) *Attorney, Agent, or Firm* — Wiggin and Dana LLP; Gregory S. Rosenblatt; Andrew D. Bochner

(57) ABSTRACT

A method and system for delivering power from an aircraft power system to a tray table is provided. The system may include a moveable assembly in connection with the tray table. Cable may be routed to each tray table through the moveable assembly. The power is processed into a useable form for electronics mounted in the tray table. The tray table may include a wireless charger, and may harvest data from user electronics. The tray table may also push data to the user's electronics. The system may include a wireless communications client to take advantage of the wireless inflight entertainment (IFE) system on board many transportation platforms.

15 Claims, 16 Drawing Sheets

(56) References Cited

U.S. PATENT DOCUMENTS

| | | |
|---|---|---|
| 8,934,063 B2 | 1/2015 | Boyer, Jr. |
| 2004/0145840 A1 | 7/2004 | Langford et al. |
| 2010/0201189 A1* | 8/2010 | Kirby .................. H04B 5/0037 |
| | | 307/9.1 |
| 2014/0183910 A1 | 7/2014 | Ulbrich-Gasparevic et al. |

OTHER PUBLICATIONS

EP 16187365.8, Partial European Search Report, European Patent Office, dated Dec. 7, 2016.
European Patent Office, EP 18 176 081.0, Extended European Search Report, dated Sep. 18, 2018.

* cited by examiner

Sketch of assembled tray with circuit card and wiring harness.

MOVEABLE SURFACE POWER DELIVERY SYSTEM

CROSS-REFERENCE TO RELATED APPLICATIONS

This application claims the benefit of U.S. Provisional No. 62/217,261, filed Sep. 11, 2015, which is incorporated herein by reference in its entirety.

FIELD OF THE DISCLOSURE

The subject matter of the present disclosure generally relates to charging systems, and more particularly relates to charging systems in airline passenger tray tables.

BACKGROUND OF THE DISCLOSURE

Previous examples exist of wireless chargers located internally in tray tables, however, these designs have several drawbacks. Particularly, they fail to provide effective means of transmitting power to the tray. Exemplary designs are disclosed by U.S. Pat. Nos. 6,489,745, 7,500,716, 7,971,929, 8,878,393, 8,826,830 and 8,934,063, the disclosures of each of which are incorporated herein by reference in their entirety. Each of these references describes the addition of permanently mounted electronics in a seat tray but fail to address upgradeability, ease of servicing of defective or broken devices, variation in charging mechanisms, or communication from the tray electronics to other systems for system health status information, the collection of metadata from the user connected device, or push-data communication for notification.

The subject matter of the present disclosure is directed to overcoming, or at least reducing the effects of, one or more of the problems set forth above.

BRIEF SUMMARY OF THE DISCLOSURE

Disclosed is a method and system to deliver power from an aircraft power system to a tray table, process this power into a useable form for the electronics mounted in the tray table, and interface with a passenger supplied personal electronic device (PED). Also disclosed is a method to harvest data from the user's PED as well as to push data to the user's PED optionally using a wireless interface. Additionally, this system can include a wireless communications client to take advantage of the wireless inflight entertainment (IFE) system on board many transportation platforms.

In an embodiment, a passenger seat and tray table are provided that supply a power and data interface to the user. The user can choose between wireless and wired charging for a PED, and two-way data communication between the PED and the transportation platform can be accomplished. This structure allows for the owner of the transportation platform to collect, for instance, demographic material data from the user, and to push advertising to the user. Advertising can be sold to help offset the cost of ownership of the system.

The system can be implemented in conjunction with a traditional, wired IFE system, a wireless IFE System, or even as a standalone system. IFE systems are well known in industry and the implementation of such integration will be apparent to those of skill in the art to which the present disclosure pertains.

The preferred embodiment consists of a seat power supply to convert aircraft power to a usable form for the electronics held in the tray. Cable routing to each tray assembly can be made through the tray moveable assembly. A connector assembly in the tray has a receptacle for the tray mounted electronics. A cartridge style electronics assembly is mounted inside the tray or a movable member of the tray.

A seat electronics box (SEB) converts incoming power to a form usable by the tray mounted electronics. In the case of the preferred embodiment, 115VAC 360-800 Hz aircraft power is converted to 28VDC power. The 28VDC power is then distributed to the seat trays where it is further processed by the tray electronics into locally-controlled voltages. These locally-controlled voltages are used to power electronics on the circuit card internal to the tray as well as provide charging power for PEDs through either a wired interface (ex. USB 2.0, USB-C, etc.) or wirelessly. Data communication from the tray-mounted circuit card may be accomplished through wireless data transmission to another on-board wireless IFE system via an appropriate protocol such as IEEE Standard 802.11 wireless communications.

The cable assembly from the SEB to a tray table assembly may be a standard wiring configuration as is well known in industrial applications. The voltage is then carried through one or both of the, typically, two movable members of the seat tray to a receptacle in the seat tray for connection to a removable charging assembly.

In certain embodiments, passing the cable through the movable tray support member includes utilizing a resilient flexible series of bends and loop coils with a flat conductor. Thus, the movement of the tray is not impeded while continuity between the SEB and the circuit card in the tray is maintained.

In addition to the method of passing the cable through the tray arms to the module in the tray, the tray arms themselves may optionally be the conductors to the tray electronics card. In such a setup, one arm carries the charger voltage and the other serves as the return path for the current. To mitigate the possibility of either tray arm having contact with the seat structure, directly or through a passenger, a two voltage source with galvanic isolation measurement can be employed in order to identify and mitigate inadvertent connections.

The power converter output could, for example, be in the range of 28VDC, centered on a virtual ground point. The virtual ground is equal to the chassis of the vehicle and seat structure. An equal and high impedance such as 1 Meg-Ohm, from both the 28VDC and the return to CHASSIS, set the virtual ground point 14VDC above the return and 14 VDC below the 28VDC. Voltage detectors monitor the voltage difference of each conductor with respect to the virtual ground, and if a difference in the 28VDC return and 28VDC in reference to chassis is noted by the detector, a FAULT condition has occurred and the power supply output can be removed.

A cartridge for the tray electronics may use the hinge pins as conductors to connect the cartridge to the seat power supply. This allows for easy removal and replacement of the tray electronics to replace faulty hardware or to change function of wireless versus wired and perform upgrades.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which.

Like reference numbers and designations in the various drawings indicate like elements.

DETAILED DESCRIPTION

Disclosed is a system for the mounting and connection of various charger and power modules attached to a passenger tray in a transportation vehicle. A movable member and a removable charging cartridge are provided, which enable wireless charging and optionally wired charging for a users' PEDs. An integrated communication system can receive data or metadata from user PEDs or provide the PEDs with pushed data. The tray and charging cartridge allow for the easy change out and replacement of charging mechanisms, replacement of broken or faulty systems, and upgrades to accommodate industry and customer changes. A PED can slide into the side of the tray, front edge of the tray, from the rear of the tray or in certain embodiments a moveable member of the tray is used to hold, communicate with and charge compatible PEDs.

Figure 1:
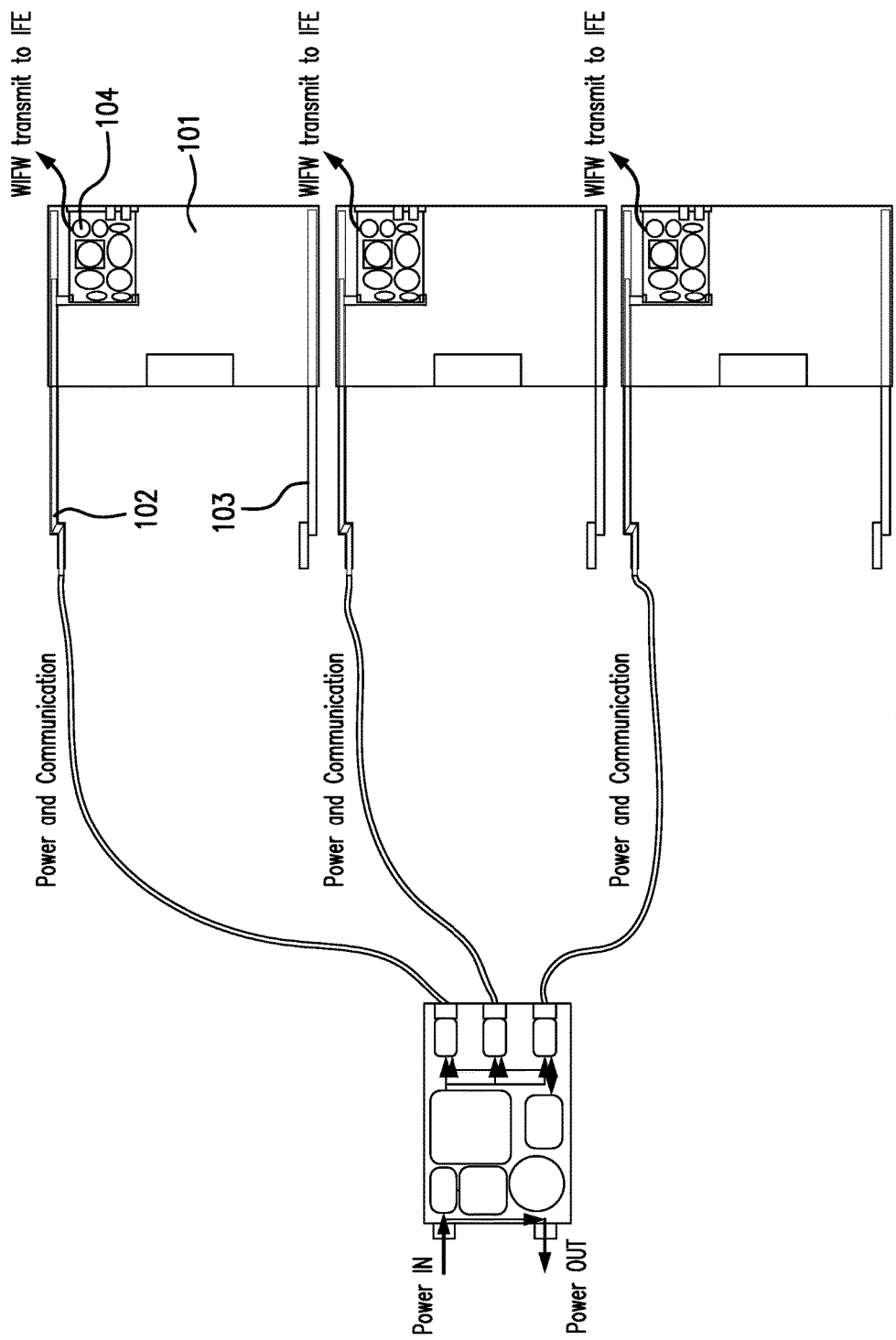
FIG. 1—Seat Electronics Diagram. This diagram shows the interconnection of the SEB with the tray table electronics.

FIG. 1 depicts a diagram of the seat electronics. Tray 101 in attached to a seat back via first moveable member 102 and second moveable member 103. One or more SEBs 105 can be used to generate the power required for any plurality of tray mounted electronic cards 104, which reside within the trays. 28VDC is passed from a SEB to the tray electronics card. From the tray electronics card, power is passed to the user device through a wireless charger complying with the Qi or REZENCE charging standards, or another electromagnetic wireless transmitter as appropriate. In addition, power can be passed to the device through a wired interface, such as a USB 2.0 or USB-C port. More than one port type may be provided to accommodate various devices.

Figure 2:
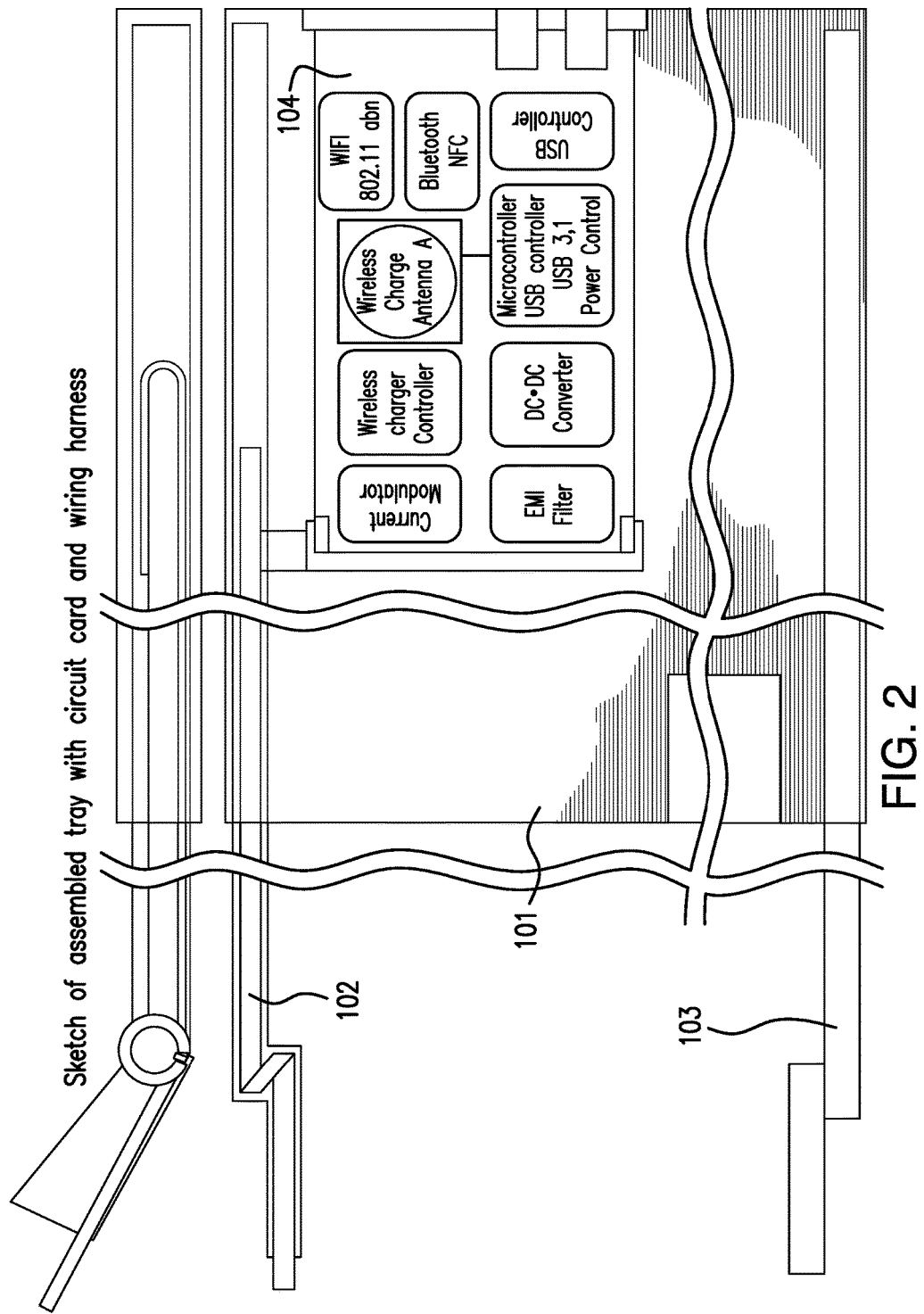
FIG. 2—Tray Table. This diagram is an exemplary installation of the tray electronics card within the tray as well as a ribbon cable being disposed in the tray support arm and connected to the tray electronics card.

FIG. 2 depicts the tray assembly as typically mounted to the rear of a passenger seat. Variations of this design are also envisioned for center articulating tray tables used in locations where there is not a seat back directly in front of the passenger, such as for the first row of coach class and premium class seats where the distance between seats prohibits easy use of a seat back mounted tray table.

Figure 3:
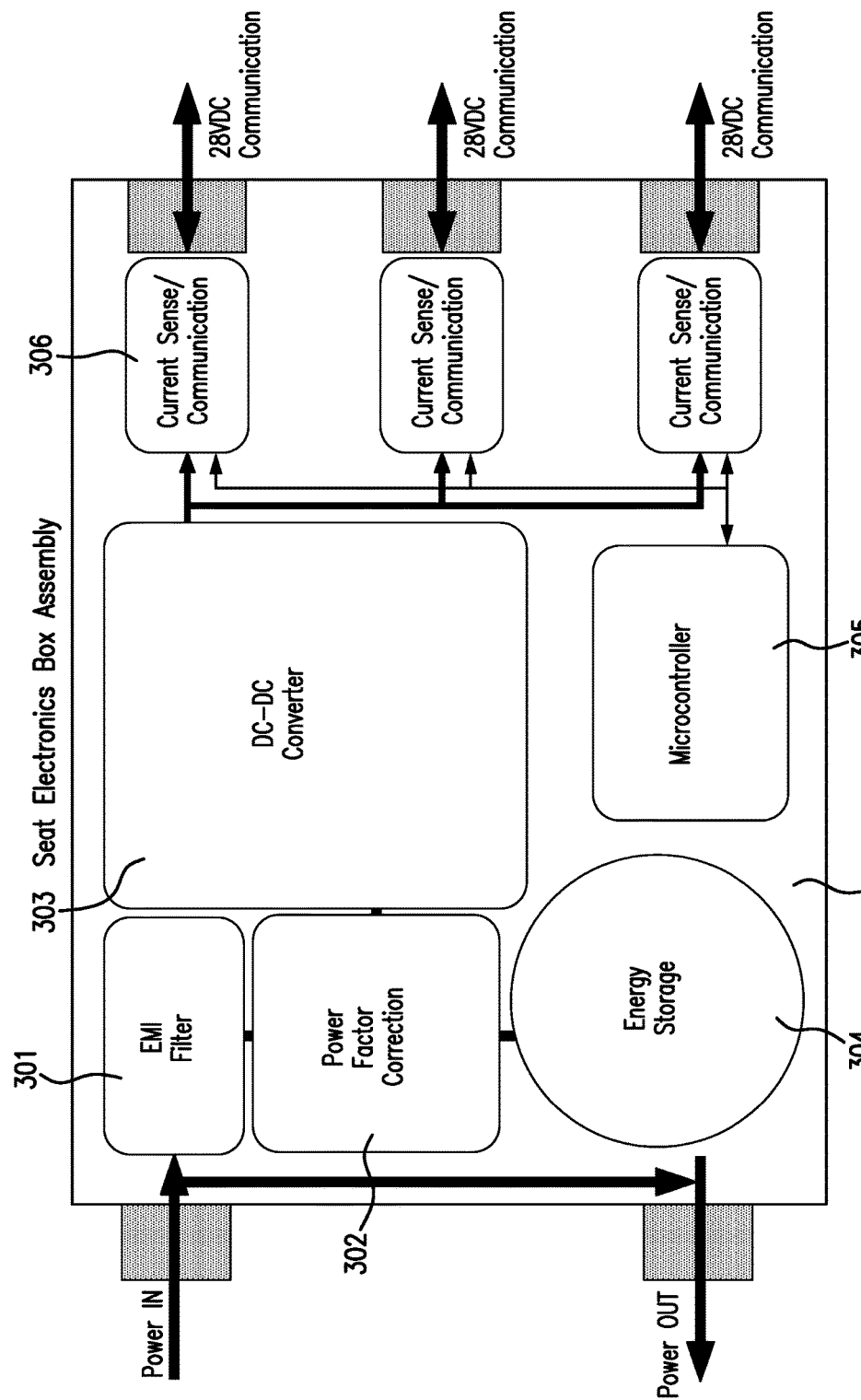
FIG. 3—Seat Electronics Box. This is an internal diagram of the major functional blocks of a SEB.

With reference to FIG. 3, during operation of the system, power is applied to SEB 300 where it is converted to the power form required by the tray electronics, which is preferably 28VDC. Power comes in to the SEB through connector POWER IN. The power may optionally be passed to a POWER OUT connector for daisy chaining between power units. The AC voltage enters the EMI filter 301 where unwanted electromagnetic interference generated by Power Factor Correction (PFC) circuit 302 and DC-DC converter 303 is filtered and blocked from disturbing the input power source. EMI filter 301 provides a power input to PFC circuit 302 where it is rectified, corrected for power factor and boosted to a high voltage for use in DC-DC converter 303. At the output of PFC circuit 302, energy storage device 304, such as a capacitor bank, stores energy for use if there is an intermittent loss of input power. This hold-up power allows the converter and attached devices to operate during short term power interruptions without disturbing the output voltage of the SEB.

Figure 5:
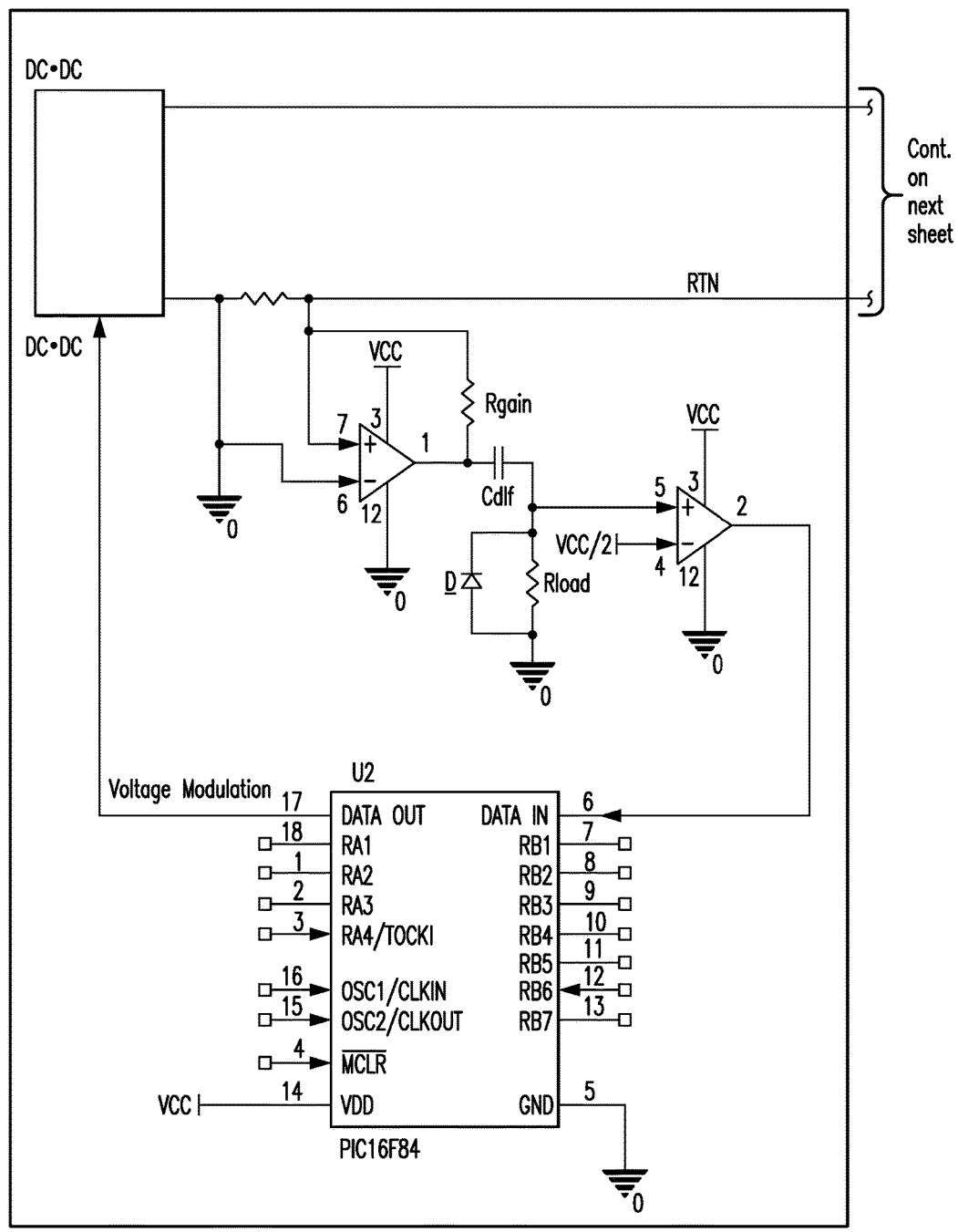
FIG. 5—Communication via current pulses example. This diagram is an example of a method for communicating over a power line using current pulses and/or voltage pulses to communicate rudimentary data such as health of the power supply for data collection.
Figure 5:
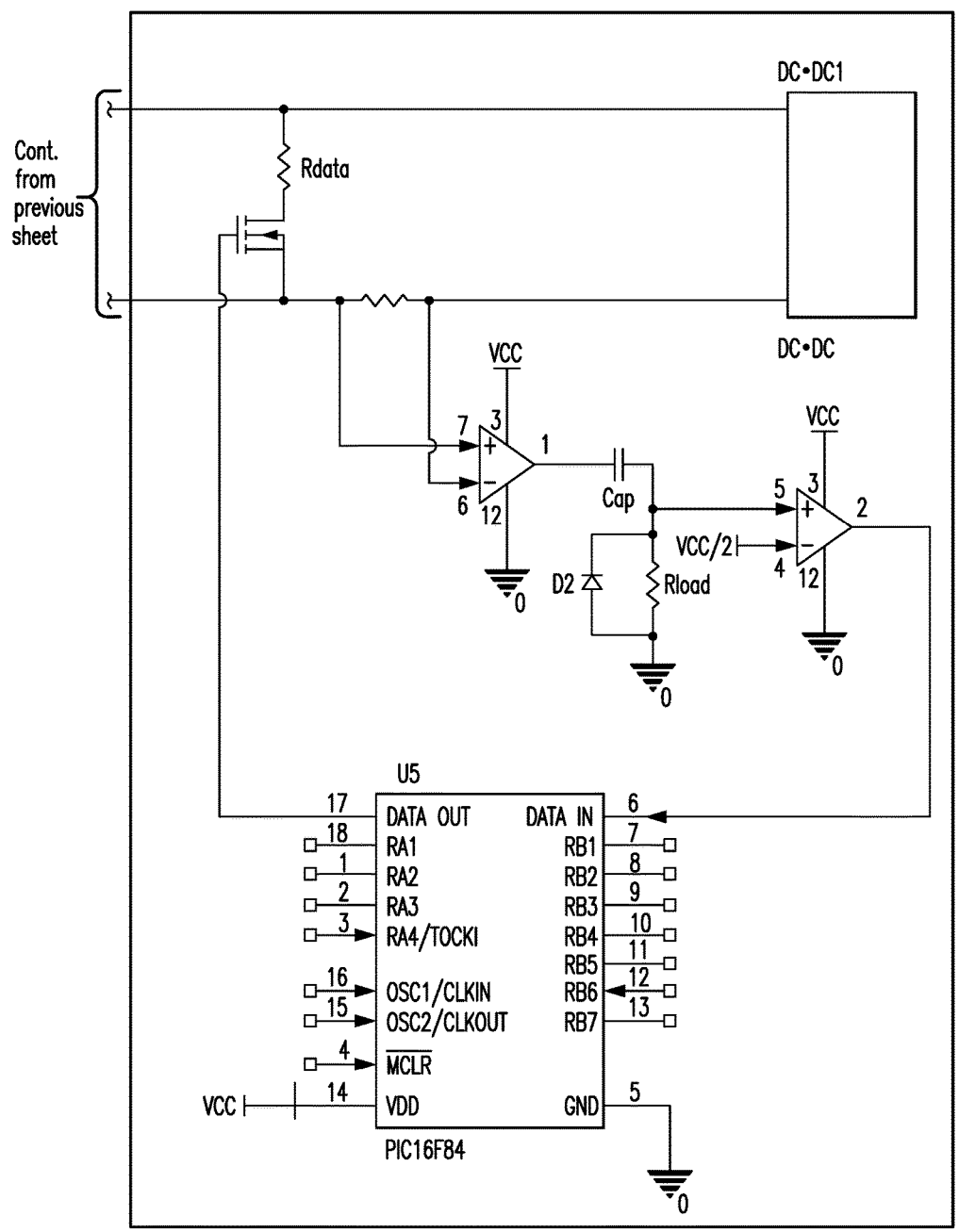

DC-DC converter 303 converts the high voltage output of PFC circuit 302 to the form used by the tray assembly. The output of DC-DC converter 303 is passed through a current-limit module as well as a current-to-data converter circuit. The current-limit module allows the seat power box to limit its output current to a specified range, typically 1 to 6 in order to protect attached wiring and devices. Other current levels can be used as long as all current carrying members are capable of carrying the full fault current. The preferred level is 28-56 Watts or 1 to 2 Amps at 28VDC. In addition to the current-limiting device, there is a current-to-data circuit (FIG. 5). The current-to-data circuit monitors the output current for encoded information transmitted by pulses of current. The attached device in the seat tray can modulate its input current in a pulse code configuration, transmitting data to the seat power box. The seat tray device turns off and on a current sink at an optional bit rate of 1 KBIT per second. The seat power box can modulate the voltage output to send data to the seat tray device also at a 1 KBIT per second rate. The seat tray device initiates the data transfer by sending an INIT (initialize) byte by modulating its current signature. This lets the seat power box know that the tray is requesting data. The seat power box returns an ACK (Acknowledge) byte to the seat tray device by modulating its voltage. Modulation of the voltage causes a corresponding modulation of the input current at the seat tray device. Data transfer is then controlled by the seat tray device while the power supply is the slave device. The current modulation is in the range of 100-200 mAmps although other levels of current can be used depending on the nominal current of the system to which it is attached.

Microcontroller 305 is powered from an internal power converter, part of the DC-DC converter, and contains the operation software for SEB 300. Microcontroller 305 monitors the temperature of the unit, current levels of the attached tray electronics assemblies, and controls the IN-USE LED used to signify that a user is consuming power. Temperature is measured through the use of a thermistor, solid state temperature monitor or other suitable temperature-to-electronic conversion method. A suitable device would be an I2C temperature interface or other equivalent circuit.

Current sense circuits 306 monitor the current used by each downstream device. The current monitor also differentiates between the ambient current used to power the downstream charger and the current data pulses used to communicate from the tray mounted charger circuit. FIG. 5 is a diagram of the circuit used to differentiate between the ambient current and the communications current. These exemplary circuits represent the detection and generation of pulses used to generate and monitor communications traffic between the tray electronics assembly and the host power supply.

Figure 4:
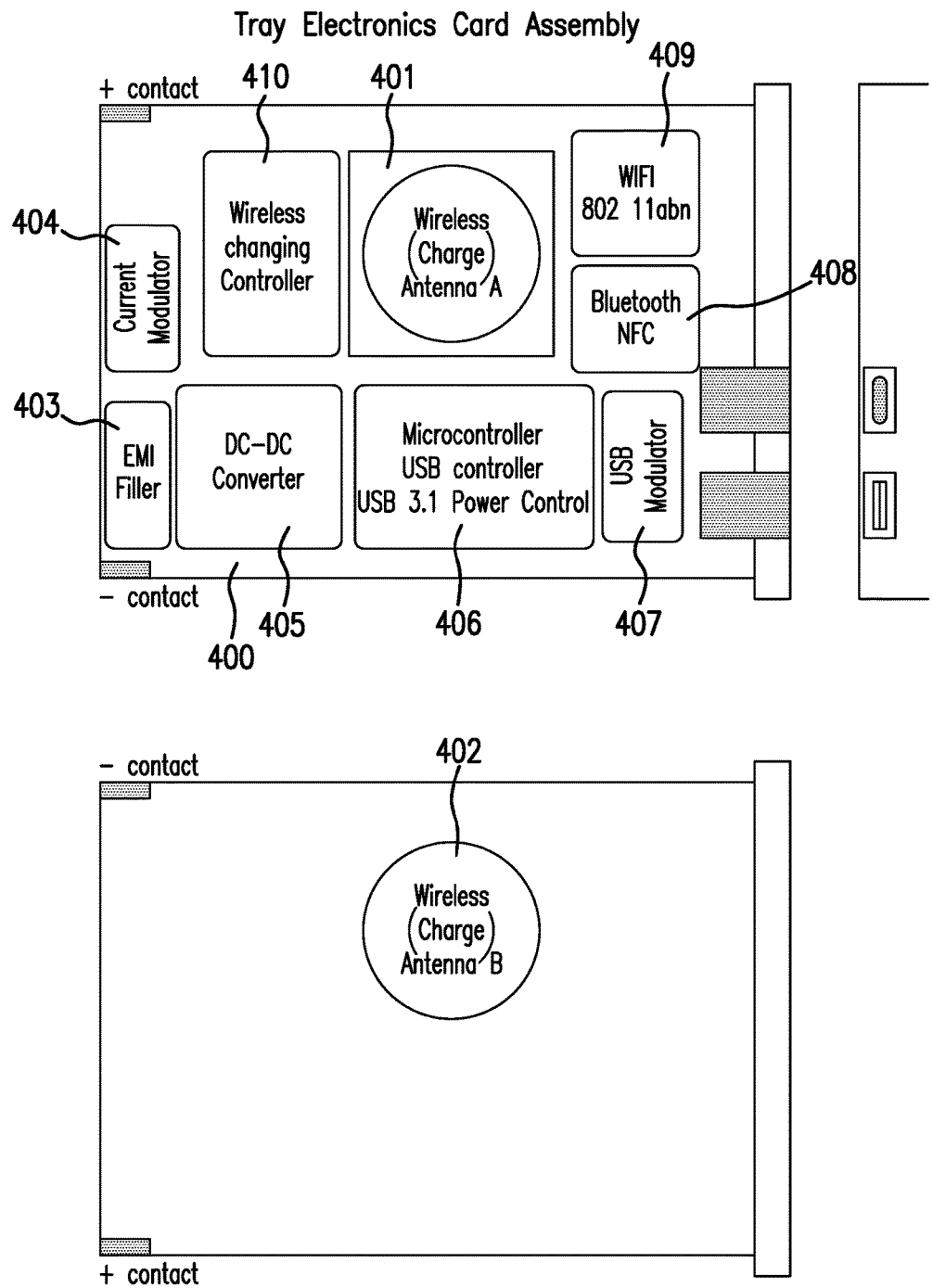
FIG. 4—Tray Electronics Card. This diagram is a depiction of the exemplary tray electronics and functions, including an input power connection, a current monitor, a wireless antenna with dual-side charging, a USB legacy (2.0) charger connection, a USB-C connection, wireless communications, Bluetooth/near Field Communication and a microcontroller.

FIG. 4 depicts embodiment tray electronics assembly 400. This assembly accomplishes communication over the 28VDC to the host power supply as well as communication and power management of the user device attached to the tray. Wireless charging is provided on both sides of ferrite antenna structure 401 to allow for charging through either the front or back of the tray table. This is particularly advantageous if the tray electronics are mounted in a moveable member. When the tray in the down position as it would be for use in food service, one side of the wireless charger will detect if a device is within range and initiate charging. When the tray is in the upright and locked position, the tray electronics mounted in the moveable member allow the moveable member to provide a holder for the user's PED as well a second antenna 402 on the reverse side of the ferrite antenna structure to allow for charging through the moveable member mount. An alternative method is to provide a magnetic interface to hold the device in place by providing a metallic plate in the device to allow a magnetic field from the tray to hold the device in place as well as center the device for charging over the wireless antenna.

Tray electronics assembly 400 also has EMI filter 403 and current modulator 404 to condition the power in the assembly. DC-DC converter 405 converts the power received by the assembly for use with the internal circuitry. Microcontroller 406 controls the operation of USB controller 407. Bluetooth/NFC circuit 408 and wireless communications adapter 409 allow for wireless communication between either or both of a PED and the aircraft's other systems, such as an IFE unit. Wireless charging controller 410 controls the wireless charging functionality of ferrite antenna structure 401.

The tray electronics card is provided as either a permanently mounted portion of the tray moveable member or as a cartridge/removable assembly. The ability to remove and replace this assembly obviates the need to remove the tray assembly when an external connector, such as the USB Type A or USB Type C, becomes unserviceable. In addition, this allows the transportation operator to choose which features are supported by replacing the tray cartridge with another supporting additional features.

Additional communication interfaces can be added to the tray electronics for communication with the user device or to an onboard wireless communications system. The use of the communication could be to harvest metadata from the user devices, push advertisements and/or greet a passenger with a personalized display when their device begins to charge. In certain embodiments, the passenger may utilize an airline specific app to gain access to flight information, gate information, meal ordering etc. through either a wired or wireless connection between the device and the aircraft wireless communications system through the tray charger. A separate hidden SSID may be used to connect the tray electronics card to the wireless communications system to protect data transfers and limit devices attached to the SSID. The use of an app allows for passenger specific information to be loaded to a passenger's PED directly. For premium and frequent flyer passengers, updates can be pushed for specials being planned for loyal customers, etc. Additional information can be harvested from these passengers for travel or hotel preferences etc.

Figure 6:
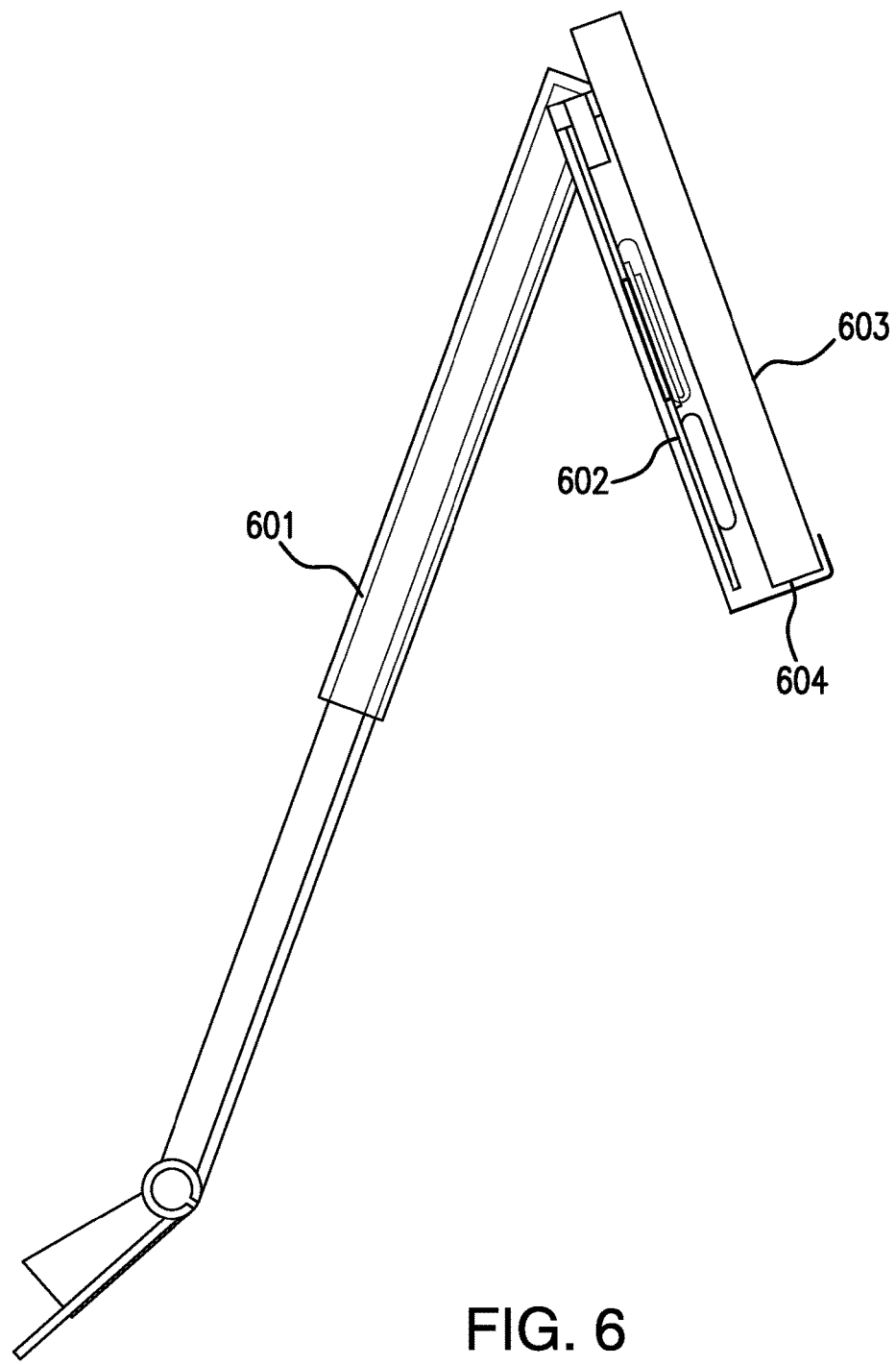
FIG. 6—This diagram is a side view of an embodiment with cellular phone installed for charging.

With reference to FIG. 6, tray 601 has a charging card assembly 602, which is configured to wirelessly charge PED 603. Receptacle 604 holds PED 603 in place during the charging process.

Figure 7:
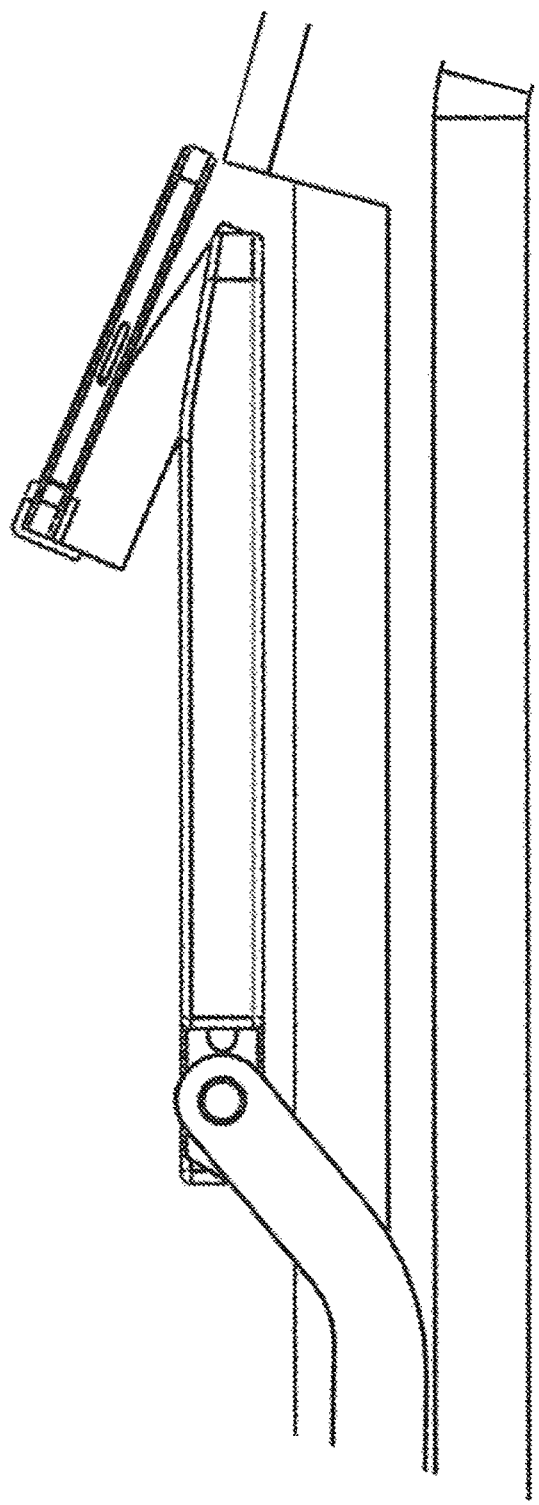
FIG. 7—This diagram is a wireframe view of FIG. 6.

FIG. 7 is a close up diagram of the side of an embodiment similar to that in FIG. 6.

Figure 8:
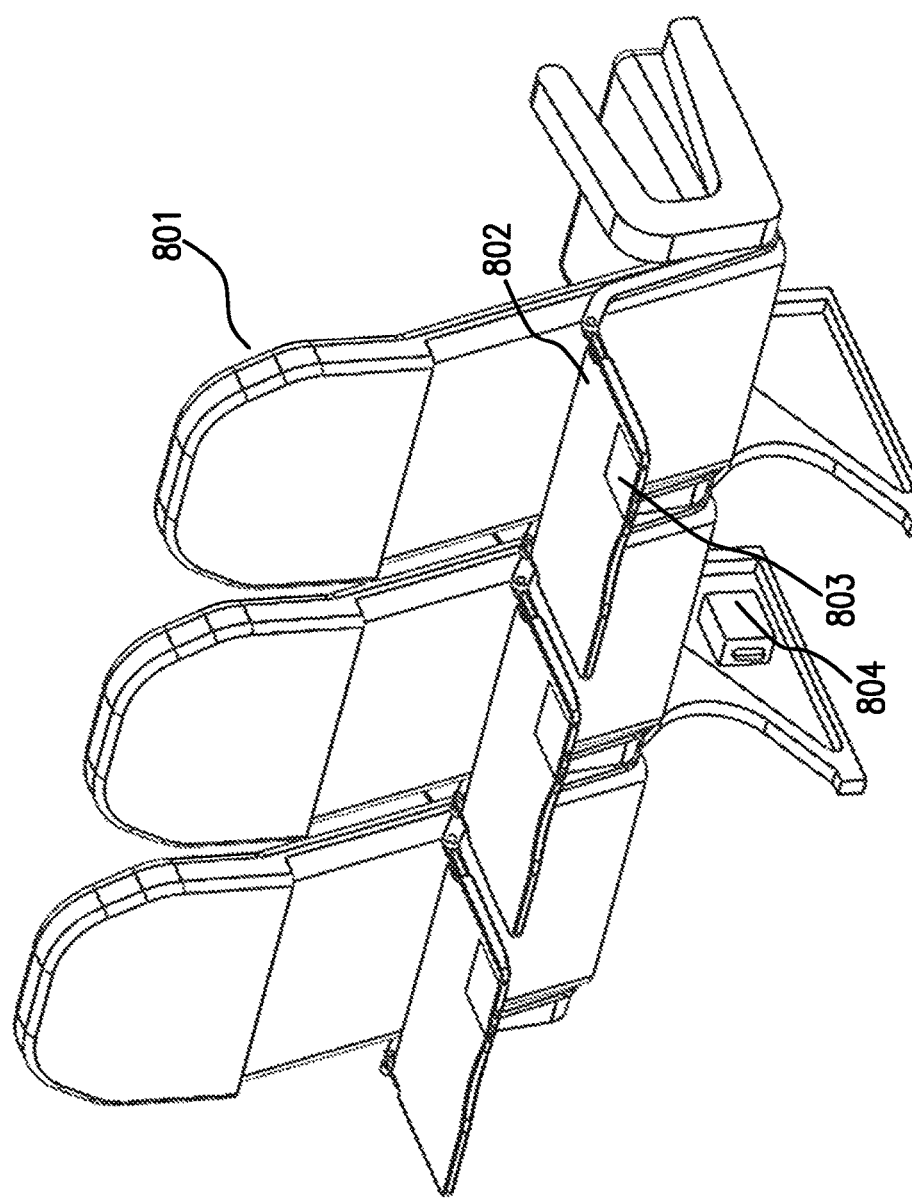
FIG. 8—This diagram shows a triple seat group including a tray mounted charger.
Figure 9:
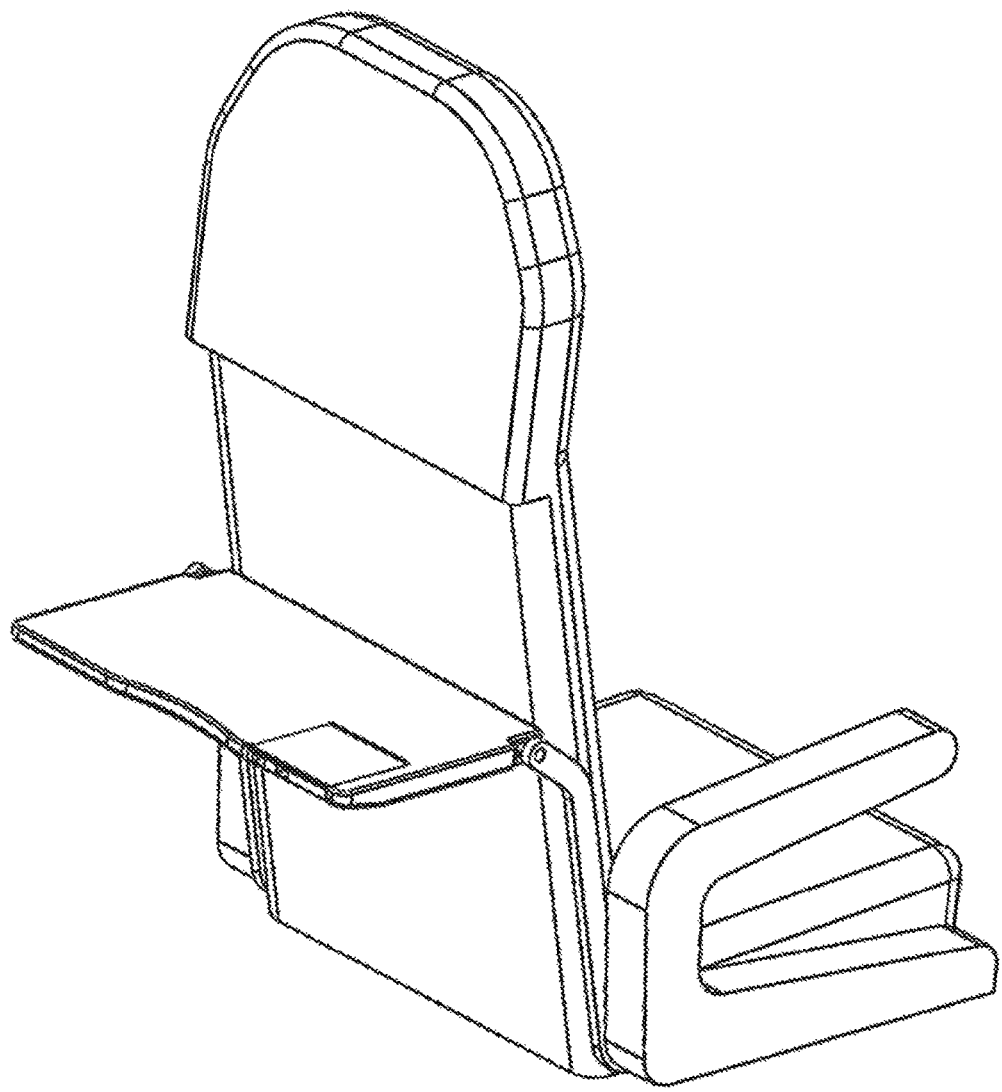
FIG. 9—This diagram shows a single seat tray in the down position.
Figure 10:
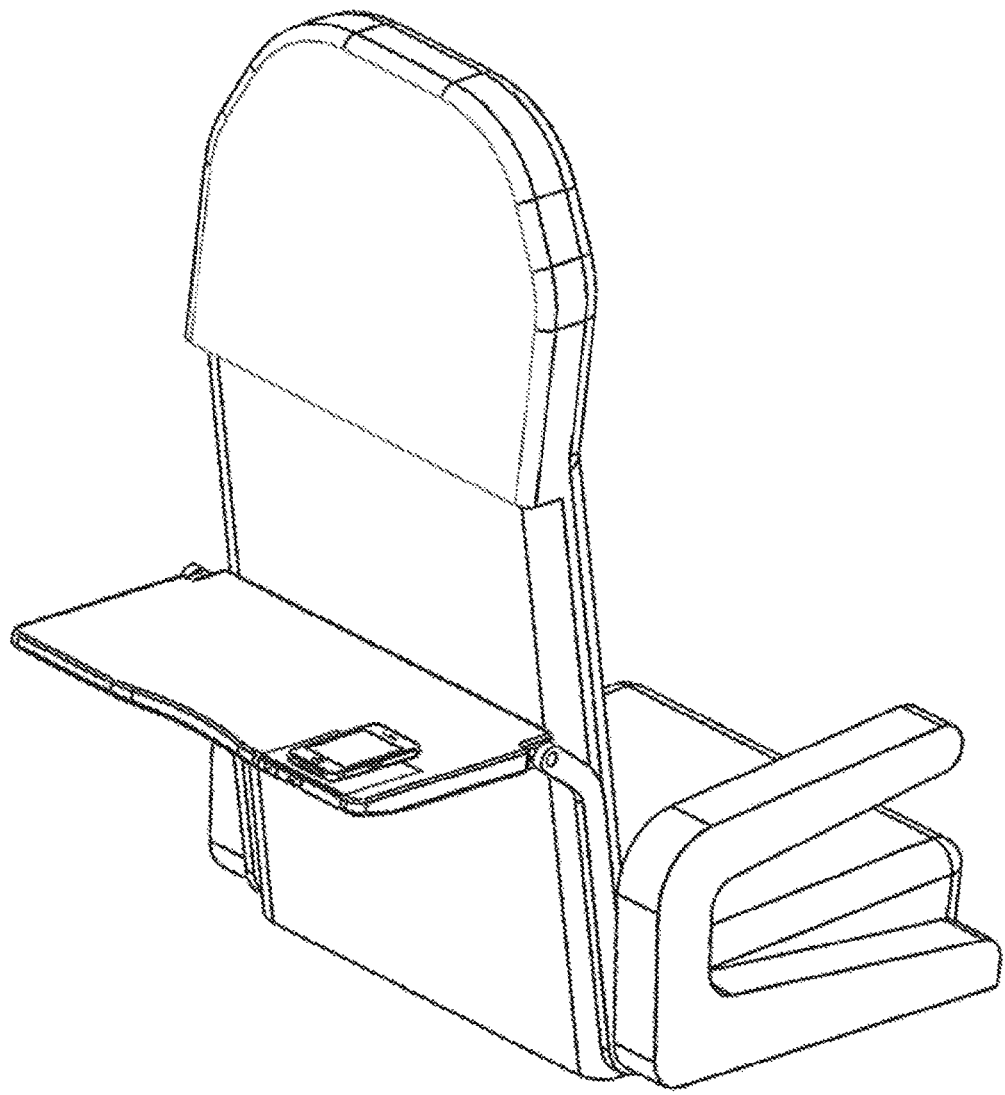
FIG. 10—This diagram shows a single seat tray in the down position with wireless charging for a PED.

FIG. 8 illustrates a seat group, seats 801 each having a tray 802 with a tray charging assembly 803, which receives power from common SEB 804. FIG. 9 is a perspective view of a single seat having such a tray/charging assembly configuration. FIG. 10 depicts a PED being wirelessly charged on the charging assembly depicted in FIG. 9.

Figure 11:
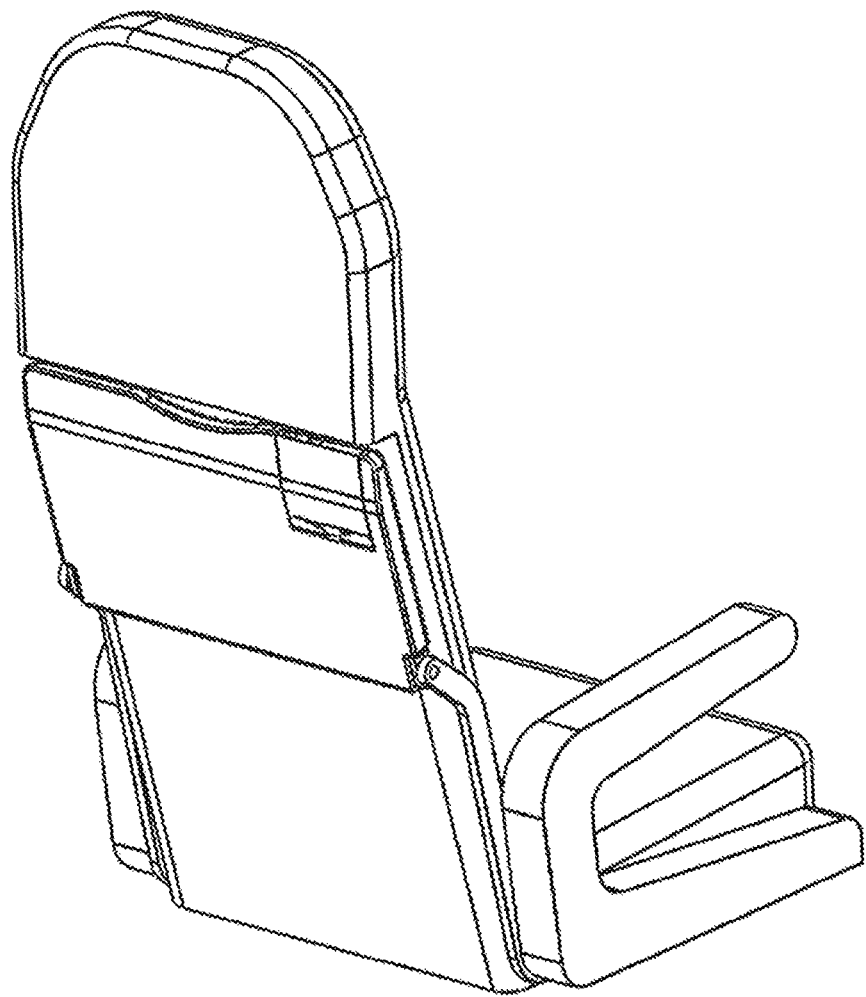
FIG. 11—This diagram shows a single seat tray in an up position.
Figure 12:
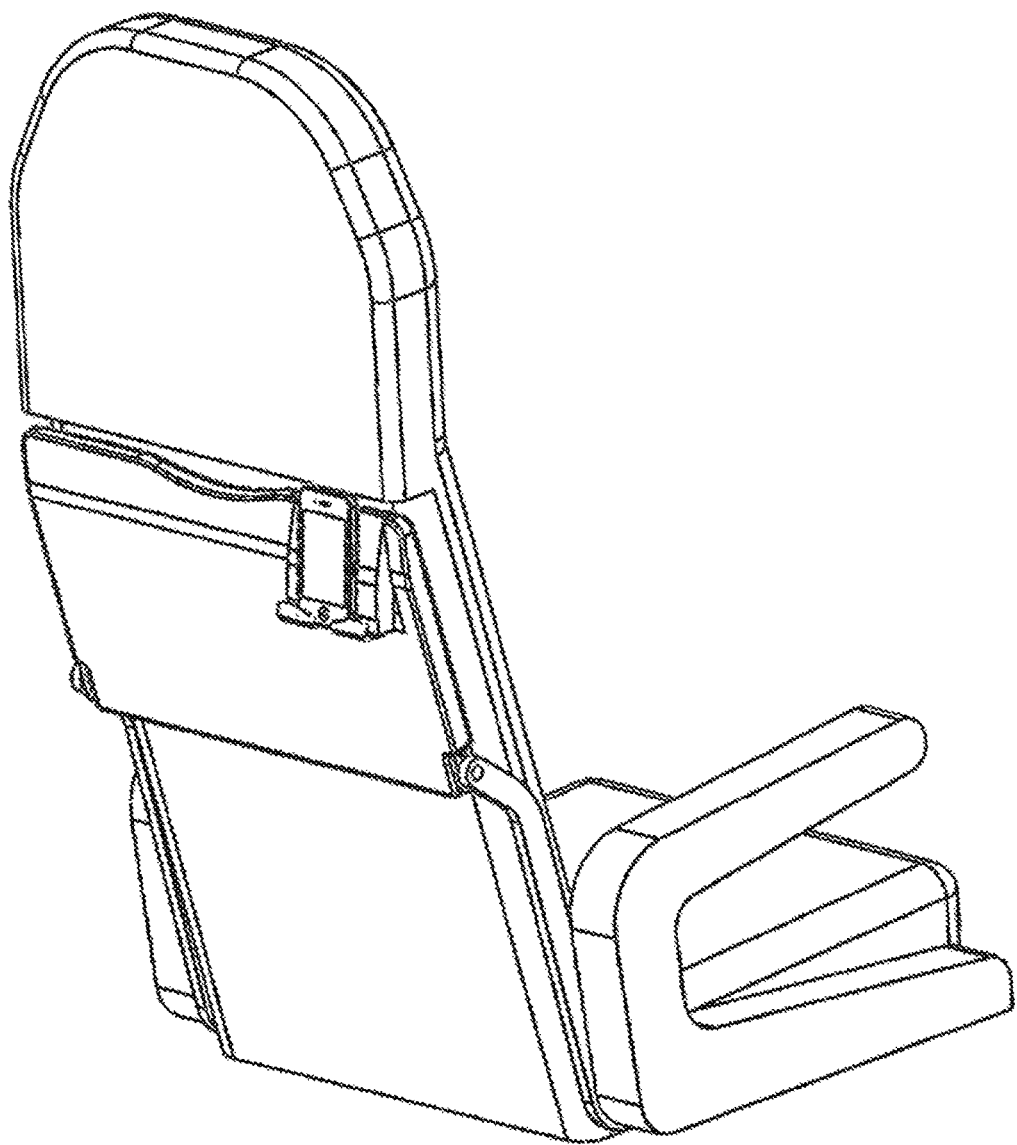
FIG. 12—This diagram shows a single seat tray in an up position during the wireless charging of a PED.

FIG. 11 depicts the tray/charging assembly of FIG. 9 in which the tray is in a stowed position. As can be viewed in FIG. 12, the side of the tray table that faces outward when the tray is stowed has formed in it a receptacle for receiving the PED so that it may be wirelessly charged even when the tray is in the stowed position.

Figure 13:
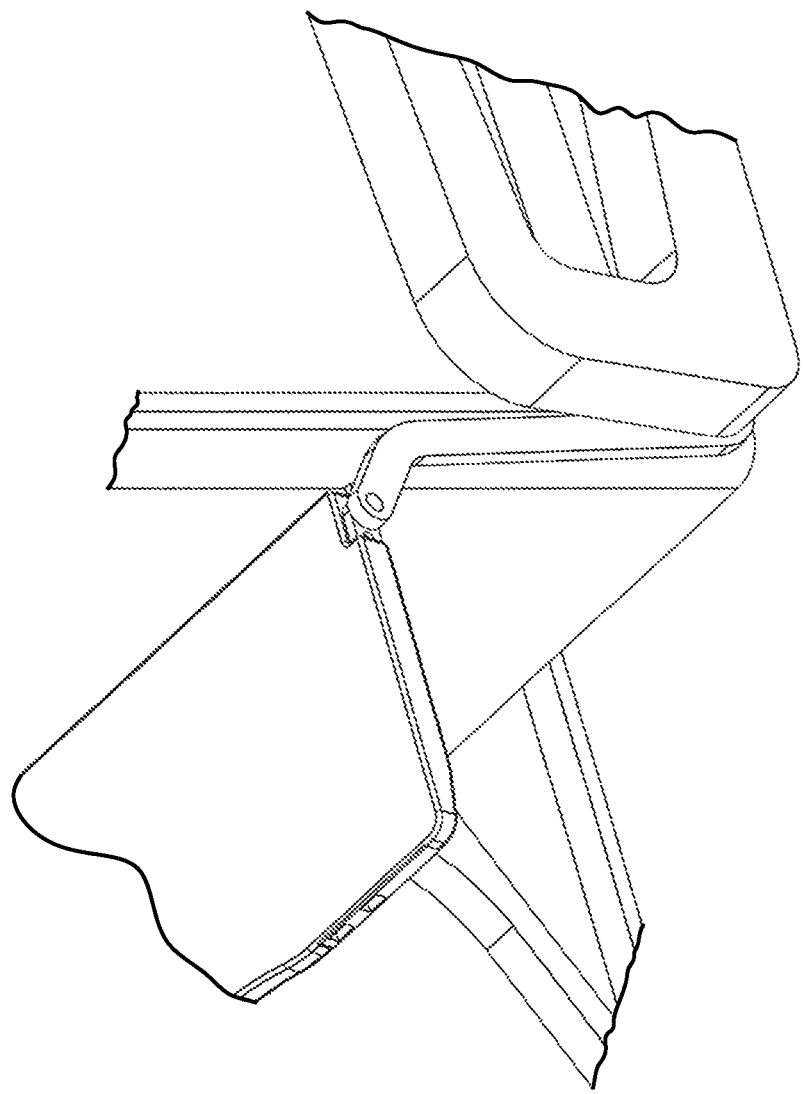
FIG. 13—This diagram shows a single seat tray with a wired style charger cartridge.

FIG. 13 depicts an embodiment having wired charging ports 1301 and 1302 to accommodate wired charging if preferred by the passenger.

Figure 14:
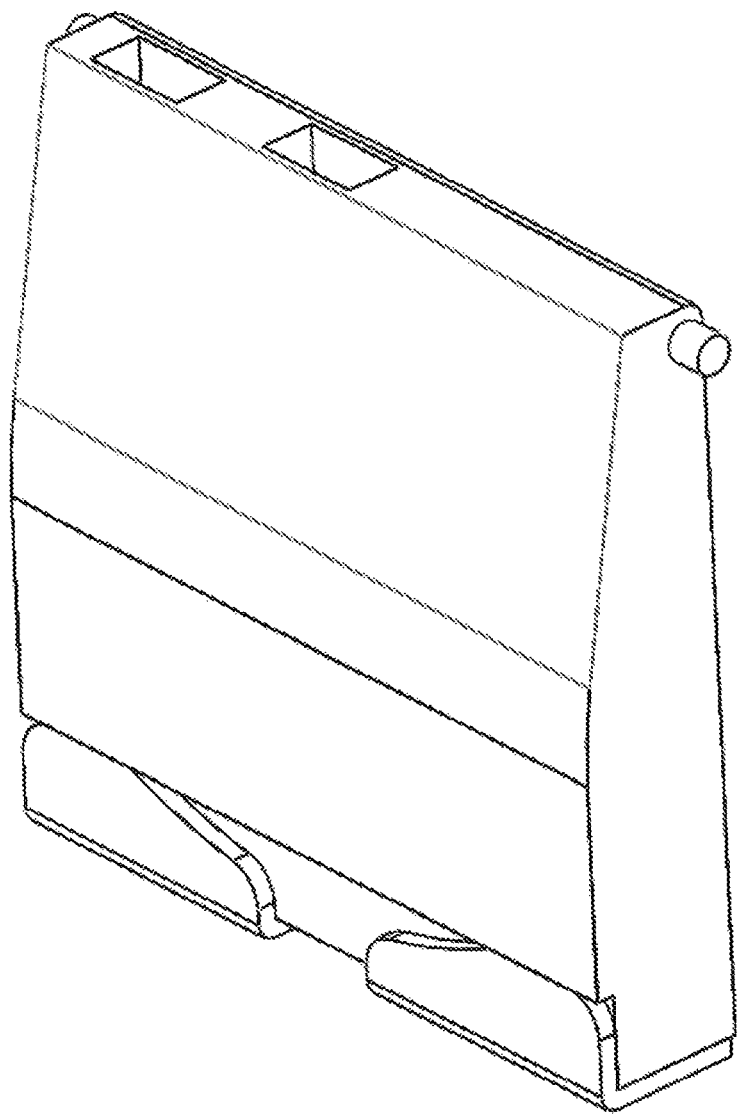
FIG. 14—This diagram shows a charging cartridge assembly with a closed cellular phone holder.
Figure 15:
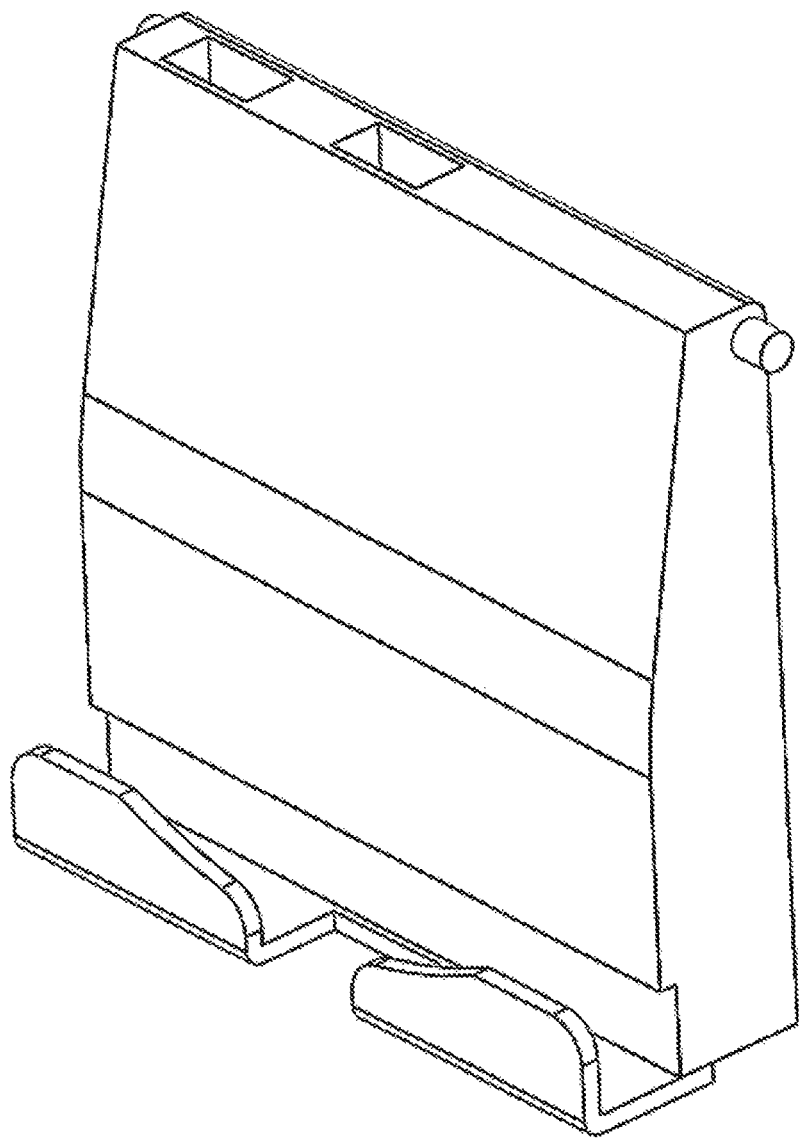
FIG. 15—This diagram shows a charging cartridge assembly with an open cellular phone holder.

FIG. 14 depicts a PED receptacle for use in certain embodiments. FIG. 15 depicts the receptacle of FIG. 14 when deployed so as to accept a PED when the accompanying tray is in a stowed position.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed:

1. A charging assembly, comprising:
   a passenger tray table;
   a first and a second moveable member interconnected to the passenger tray table;
   wherein disposed within the tray table is a removably connected charging card assembly; and
   wherein the charging assembly includes a wireless charging device having a first antenna adjacent a first side of the passenger tray table and a second antenna adjacent an opposing second side of the passenger tray table configured to wirelessly charge a personal electronic device (PED) both when the passenger tray is in a stowed position and when the passenger tray is in a deployed position.

2. The charging assembly of claim 1 wherein the charging card assembly includes a microcontroller, an electromagnetic interference (EMI) filter, a DC-DC converter, a wireless communications adapter and a Bluetooth adapter.

3. The charging assembly of claim 1 wherein the charging assembly further includes at least one wired charging port.

4. The charging assembly of claim 1 wherein the first moveable member is a conductor effective to supply power to the charging card from a seat electronics box, and the second moveable member enables the charging card to return to the seat electronics box.

5. A charging assembly, comprising:
a passenger tray table;
a first and a second moveable member interconnected to the passenger tray table, wherein the first moveable member is a conductor effective to supply power to a charging card assembly from a seat electronics box, and the second moveable member enables the charging card to return power to the seat electronics box;
a voltage monitor is configured to detect a fault condition by monitoring voltage on each of the first moveable member and the second moveable member relative to a common ground;
wherein removably connected to the tray table is the charging card assembly; and
wherein the charging card assembly includes a wireless charging device configured to wirelessly charge a personal electronic device (PED) both when the passenger tray is in a stowed position and when the passenger tray is in a deployed position.

6. A charging assembly, comprising:
a passenger tray table;
a first and a second moveable member interconnected to the passenger tray table, both formed from a conductive material that is covered in an electrically non-conducting material;
wherein the first moveable member is a conductor effective to supply power to a charging card assembly from a seat electronics box, and the second moveable member enables the charging card assembly to return power to the seat electronics box;
wherein removably connected to the tray table is the charging card assembly; and
wherein the charging card assembly includes a wireless charging device configured to wirelessly charge a personal electronic device (PED) both when the passenger tray is in a stowed position and when the passenger tray is in a deployed position.

7. The charging assembly of claim 1 wherein the charging card assembly is configured to send data to the PED.

8. The charging assembly of claim 1 wherein the charging card assembly is configured to receive data from the PED.

9. A charging assembly, comprising:
a tray table including an electronic circuit card;
a moveable assembly in connection with the tray table that includes a plurality of tray arms for conducting electricity, a first tray arm configured to carry a charger voltage and a second tray arm configured to act as a return path for current;
a connector assembly disposed within the tray table, the connector assembly including a receptacle for receiving a personal electronic device (PED);
an electronics assembly mounted within the tray table; and
a seat electronics box (SEB) in communication with the electronics assembly via a cable assembly, the SEB configured to convert and supply power to the electronics assembly,
wherein the electronics assembly is configured to charge the PED received in the connector assembly.

10. The charging assembly of claim 9 wherein the apparatus further includes a two voltage source with galvanic isolation measurement, the two voltage source configured to identify and mitigate inadvertent connections.

11. A charging assembly, comprising:
a passenger tray table including a charging card assembly, the charging card assembly including a wireless charging device;
a moveable assembly in connection with the tray table; and
a connector assembly disposed within the tray table, the connector assembly including a receptacle for receiving a personal electronic device (PED);
wherein the wireless charging device has a first antenna adjacent a first side of the passenger tray table and a second antenna adjacent an opposing second side of the passenger tray table is configured to wirelessly charge a PED both when the passenger tray table is in a stowed position and charge the PED when the passenger tray table is in a deployed position, and
wherein the charging card assembly is configured to receive data from, and send data to, the PED.

12. The charging assembly of claim 11 wherein the charging assembly further includes at least one wired charging port.

13. The charging assembly of claim 11 wherein the first moveable member acts as a conductor for supplying power to the charging card assembly from a seat electronics box, and the second moveable member acts as a return from the charging card assembly to the seat electronics box.

14. A charging assembly, comprising:
a tray table including a charging card assembly, the charging card assembly including a wireless charging device;
a first and a second moveable member interconnected to the tray table wherein the first moveable member is a conductor for supplying power to the charging card assembly from a seat electronics box, and the second moveable member is a power return from the charging card assembly;
a voltage monitor configured to detect a fault condition by monitoring voltage on each of the first moveable member and the second moveable member relative to a common ground; and
a connector assembly disposed within the tray table, the connector assembly including a receptacle for receiving a personal electronic device (PED);
wherein the wireless charging device is configured to wirelessly charge the PED when the tray table is in a stowed position and when the tray table is in a deployed position, and
wherein the charging card assembly is configured to receive data from, and send data to, the PED.

15. A charging assembly, comprising:
a tray table including a charging card assembly, the charging card assembly including a wireless charging device;
a first and a second moveable member interconnected to the tray table, the first and the second moveable member formed from a conductive material that is covered in a non-conducting material, wherein the first moveable member is a conductor for supplying power to the charging card assembly from a seat electronics box, and the second moveable member is a power return from the charging card assembly;
a connector assembly disposed within the tray table, the connector assembly including a receptacle for receiving a personal electronic device (PED);
wherein the wireless charging device is configured to wirelessly charge the PED when the tray table is in a stowed position and when the tray table is in a deployed position, and wherein the charging card assembly is configured to receive data from, and send data to, the PED.

* * * * *